United States Patent
Guest et al.

(10) Patent No.: US 8,001,989 B2
(45) Date of Patent: Aug. 23, 2011

(54) LIQUID FLOW CONTROL DEVICE

(75) Inventors: John Derek Guest, Bray (GB); Timothy Stephen Guest, Bray (GB)

(73) Assignee: John Guest International Limited, Middlesex (GB)

( * ) Notice: Subject to any disclaimer, the term of this patent is extended or adjusted under 35 U.S.C. 154(b) by 67 days.

(21) Appl. No.: 12/711,098

(22) Filed: Feb. 23, 2010

(65) Prior Publication Data

US 2010/0148097 A1 Jun. 17, 2010

Related U.S. Application Data

(62) Division of application No. 11/463,270, filed on Aug. 8, 2006.

(30) Foreign Application Priority Data

Aug. 11, 2005 (GB) .................................. 0516532.9

(51) Int. Cl.
*F16K 17/00* (2006.01)
*F16K 31/12* (2006.01)

(52) U.S. Cl. .............................. 137/67; 137/455; 251/12

(58) Field of Classification Search .................... 137/67, 137/68.11, 78.3, 455, 883, 885; 251/12, 251/14

See application file for complete search history.

(56) References Cited

U.S. PATENT DOCUMENTS

| | | | |
|---|---|---|---|
| 2,633,131 A | 3/1959 | Grosvenor | |
| 3,204,872 A | 9/1965 | Whear | |
| 3,298,391 A | 1/1967 | Savage | |
| 3,426,539 A | 2/1969 | Whear | |
| 3,620,248 A | 11/1971 | Cary | |
| 3,833,013 A | 9/1974 | Leonard | |
| 4,182,357 A | 1/1980 | Ornstein | |
| 4,739,789 A | 4/1988 | Hamilton | |
| 4,922,945 A | 5/1990 | Browne | |
| 4,989,628 A | 2/1991 | Gil et al. | |
| 5,273,066 A | 12/1993 | Graham et al. | |
| 7,506,658 B2 | 3/2009 | Guest et al. | |
| 7,690,391 B2 * | 4/2010 | Guest et al. | 137/67 |
| 2002/0124880 A1 | 9/2002 | Tanikawa | |

OTHER PUBLICATIONS

Office Action issued in U.S. Appl. No. 11/463,270, filed Aug. 8, 2006, dated Apr. 13, 2009.
Amendment filed in U.S. Appl. No. 11/463,270, filed Aug. 8, 2006, dated Oct. 7, 2009.
Notice of Allowance issued in U.S. Appl. No. 11/463,270, filed Aug. 8, 2006, dated Dec. 16, 2009.

* cited by examiner

*Primary Examiner* — John Rivell
(74) *Attorney, Agent, or Firm* — Workman Nydegger

(57) ABSTRACT

A liquid flow control device has a port or passageway through which liquid flow is to be controlled. A body of a liquid swellable material is located in the port or passageway having an upstream side and a downstream side in relation to the direction of liquid flow through the port or passageway. A layer of sealing material is provided on the upstream side of the body to prevent contact of that side of the body with the liquid when the body is swollen to close the port or passageway whilst allowing contact of the downstream side of the body when the body is in the non-swollen condition allowing liquid flow through the port or passageway.

3 Claims, 1 Drawing Sheet

LIQUID FLOW CONTROL DEVICE

CROSS-REFERENCE TO RELATED APPLICATIONS

This application is a divisional of U.S. patent application Ser. No. 11/463,270, filed Aug. 8, 2006, which claims priority to United Kingdom Application No. 0516532.9, filed Aug. 11, 2005, which applications are incorporated herein by specific reference.

BACKGROUND OF THE INVENTION

1. The Field of the Invention
This invention relates to liquid flow control devices.
2. The Relevant Technology
Many different forms of valving arrangements are known for controlling liquid flow through a port or passageway. Such arrangements include the use of liquid swellable materials which enlarge with contact with a liquid to obstruct a passageway or port and which shrink when not in contact with a liquid to allow flow through the passageway or port. Such arrangements can be utilized in automatic on/off systems for controlling liquid flow such as systems for watering for horticultural or agricultural applications.

SUMMARY OF THE INVENTION

This invention provides a liquid flow control device having a port or passageway through which liquid flow is to be controlled, a body of a liquid swellable material located in the port or passageway having an upstream side and a downstream side in relation to the direction of liquid flow through the port or passageway, and a layer of sealing material on the upstream side of the body to prevent contact of that side of the body with the liquid when the body is swollen to close the port or passageway whilst allowing contact of the downstream side of the body when the body is in the non-swollen condition allowing liquid flow through the port or passageway.

In one arrangement according to the invention the body of liquid swellable material may be partially encapsulated in a layer of sealing material to prevent the body being wetted by said liquid on the upstream side thereof leaving the side of the body on the downstream side exposed for contact with the liquid.

More specifically the layer of sealing material may extend over said upstream side of the body and around the periphery of the body, between the body and an encircling face of the port or passageway with which the body/sealing layer forms a seal when the body is in said swollen condition.

In any of the above arrangements means may be provided in the port or passageway to locate the body in the port or passageway.

In the latter case the port or passageway may have spaced abutments encircling the port or passageway between which the body of swellable material is located and constrained movement along the port or passageway with the liquid flow.

Also, in any of the above arrangements the passageway may be formed in a tube or cylindrical body to receive a liquid flow.

In a further arrangement according to the invention the device may include an annular housing comprising a peripheral wall and side walls which provide an enclosure for the body of water swellable material, the roof or wall of the housing having one or more orifices providing inlet ports for liquid flow into the housing and one side wall of the housing having an outlet opening for liquid flow out of the housing, the body of water swellable material within the housing having an encircling sealing layer around its periphery which engages the inner periphery of the housing with swelling of the body of material to close off flow of liquid into the housing through said port or ports and to allow liquid flow through the housing when the body of swellable material is in its contracted condition.

For example the housing may be mounted in a tube or cylindrical body through which cylindrical flows to regulate flow from the tube or coupling body.

BRIEF DESCRIPTION OF THE DRAWINGS

The following is a description of some specific embodiments of the invention, reference being made to the accompanying drawings in which.

DETAILED DESCRIPTION OF THE PREFERRED EMBODIMENTS

Figure 1:
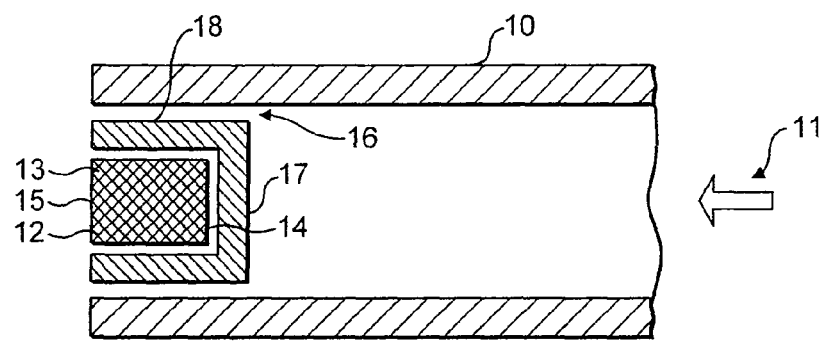
FIG. 1 is a diagrammatic sectional view of a passageway having a flow control arrangement according to the invention.

Referring firstly to FIG. 1, there is shown a tube or cylindrical body 10 to which a water supply is connected to provide a flow of water through the tube or body in the direction of the arrow 11.

The body contains a cylindrical block 12 of water swellable material having an annular periphery 13, an upstream side face 14 and a downstream side face 15. The block is positioned approximately centrally within the tube or body.

The block is enclosed or encapsulated on the upstream and peripheral sides in a cover 16 of sealing material having a base 17 which engages the upstream side 14 of the body and an annular wall 18 which engages the outer periphery 13 of the body 12.

The body 12 is shown spaced from the walls of the housing for the purposes of illustration but in practice the body is a snug fit in the cover so that the upstream side 14 of the body and periphery 13 of the body are protected from contact with water flowing through the conduit leaving only the downstream side 15 of the body contactable with water in the tube or cylindrical body.

Water flows through the tube or cylindrical body in the direction of the arrow 11 and over the housing 16 to the rearward side of the body 12 where it has contact with the downstream surface 15 of the body. The water will cause the body 15 to swell or enlarge and eventually the body will have expanded radially sufficiently to force the peripheral wall 18 of the cover 16 into sealing engagement with the inner surface or the tube or cylindrical body thereby closing off flow of water through the tube or body.

The cover 16 protects the body 12 from contact with water upstream of the body and the downstream side 15 of the body will provide a surface from which water can be released from the water swellable material over a period of time allowing the material to shrink or contract and thereby releasing the seal between the periphery 18 of the cover and inner surface of the tube or coupling body. Water flow will then be re-established through the tube or coupling body until the body 12 has been caused to swell again as a result of contact between the water and the downstream side of the coupling body to a point where the seal between the periphery 18 of the cover is re-established with the wall of the coupling body.

The relative dimensions of the box 15 to the diameter of the tube or coupling body, the thickness of the walls of the housing 16 and the amount of the rearward or downstream side of the body of swellable material can all be adjusted to provide the required on/off characteristic for the flow control device.

Figure 2:
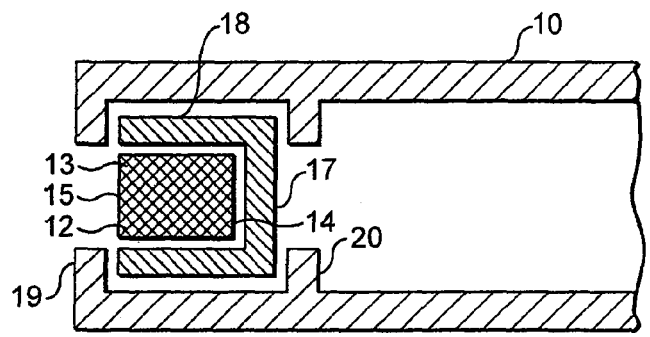
FIG. 2 is a modified version of the arrangement of FIG. 1.

Reference is now made to FIG. 2 of the drawings which shows a very similar arrangement and like parts have been allotted the same reference numerals. The main difference is that the means for locating the block of water swellable material 12 and cover 16 are provided comprising annular abutments 19,20 encircling the inward side of the tube or cylindrical body 10 at spaced locations and extending sufficiently inwardly of the body to trap the block of swellable material and its cover between them. The arrangement is otherwise similar to that of FIG. 1 as described above.

Figure 3:
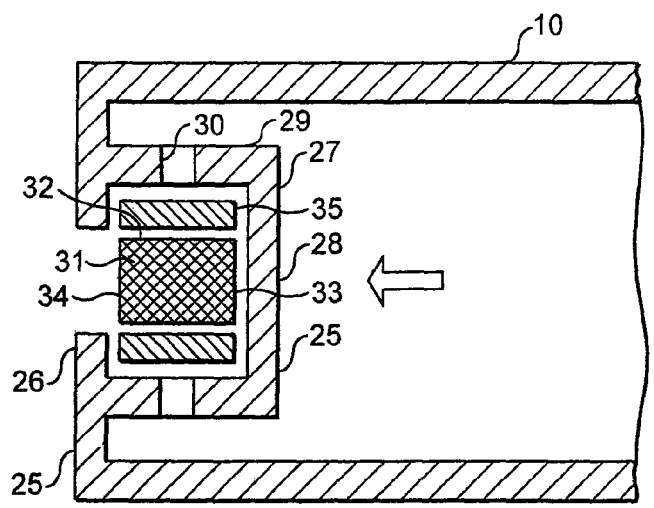
FIG. 3 is a diagrammatic view of a further variation.

Reference is now made to FIG. 3 which shows a further variation on which the tube or cylindrical body 10 has an end wall 25 with a central outlet port 26 and cylindrical housing 27 formed integrally around the end wall 25 within the tube or cylindrical body. Housing 27 has a closed end wall 28 and a peripheral wall 29 formed with spaced orifices 30 through which water flowing through the tube or cylindrical body 10 can pass into the housing. Within the housing there is a body of water swellable material 31 of cylindrical form having a peripheral wall 32 inside faces 33 and 34. The peripheral surface is encircled by a closely fitted ring of sealing material 35 which forms a seal with the inside of the annular housing over the orifices 30 when the water swellable material 31 enlarges with contact with water to close the orifices and terminate flow.

When water through the housing terminates, the exposed surfaces 33 and 34 of the block of water swellable material eventually dry out and release moisture to atmosphere. The resulting shrinkage of the block of swellable material ultimately releases the seal of the annular sleeve with the peripheral wall of the housing 27 to allow water flow through the orifices 30 to the outlet 26 to be re-established. The resulting water flow over the exposed face 33 of the block of water swellable material will cause the block to swell again ultimately re-establishing the seal with the inner periphery of the housing 27 over the orifices 30 to close off water flow through the orifices.

The arrangement of the water swellable block 31 with its encircling annular seal 35 in which the block is encapsulated will allow the combination of water swellable material and sealing material to be co-extruded. The housing arrangement of FIG. 3 could also be used with the block and layer of sealing material encapsulating the block of FIGS. 1 and 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A flow control device comprising:
   an annular housing having a peripheral wall and side walls which provide an enclosure for a body of liquid swellable material, the peripheral wall of the housing having one or more orifices providing inlet ports for liquid flow into the housing one of said side walls of the housing to be located in a downstream position of the device having an outlet opening for liquid flow out of the housing and the other side to be located in an upstream position being closed; and
   a body of a liquid swellable material located in the housing having an upstream side, an outer periphery and a downstream side in relation to the direction of liquid flow through the device, the body of liquid swellable material within the housing having an encircling sealing layer around its outer periphery to engage the inner periphery of the housing when the body of material is in a swollen condition from contact with liquid to close off flow of liquid through the housing and to allow liquid flow through the housing when the body of swellable material is in its contracted condition.

2. A flow control device as claimed in claim 1, wherein the housing is mounted concentrically in a tube or cylindrical body through which liquid flows with the closed side wall of the housing upstream of the open side wall and the periphery of the housing spaced inwardly of the tube or cylindrical body.

3. A flow control device as claimed in claim 2, wherein the tube or cylindrical body has a transverse barrier extending across the body and the housing is mounted in the barrier.

* * * * *